United States Patent [19]
Petersen

[11] 4,223,771
[45] Sep. 23, 1980

[54] BRAKE CLUTCH

[75] Inventor: Walter J. Petersen, Eden Prairie, Minn.

[73] Assignee: The Toro Company, Minneapolis, Minn.

[21] Appl. No.: 921,059

[22] Filed: Jun. 30, 1978

[51] Int. Cl.² .................. F16D 13/76; F16D 67/00
[52] U.S. Cl. .............................. 192/10; 474/37; 474/43
[58] Field of Search ............... 74/230.17 R, 230.17 A, 74/230.17 D; 192/10

[56] References Cited
U.S. PATENT DOCUMENTS

| 1,498,926 | 6/1924 | Maimin | 192/10 |
| 1,519,294 | 12/1924 | Cullander et al. | 192/10 |
| 4,116,080 | 9/1978 | Berens | 74/230.17 A |

OTHER PUBLICATIONS

K. M. Clutch Co., V-Belt Clutch & K-Matic Centrifugal; vol. 1, No. 2.

Primary Examiner—H. Hampton Hunter
Attorney, Agent, or Firm—Merchant, Gould, Smith, Edell, Welter & Schmidt

[57] ABSTRACT

An apparatus for selectively transmitting power between a rotating shaft and a belt including an integral brake member. The apparatus includes a pulley affixed to the shaft and which frictionally engages the belt. The pulley includes a pair of sheave halves which are reciprocable axially with respect to each other between belt engaged and disengaged positions. The integral brake member is mounted about the shaft between the sheave halves and affixed against rotation with the shaft. In the disengaged position the belt drops onto the brake member and is brought to a rapid stop.

11 Claims, 4 Drawing Figures

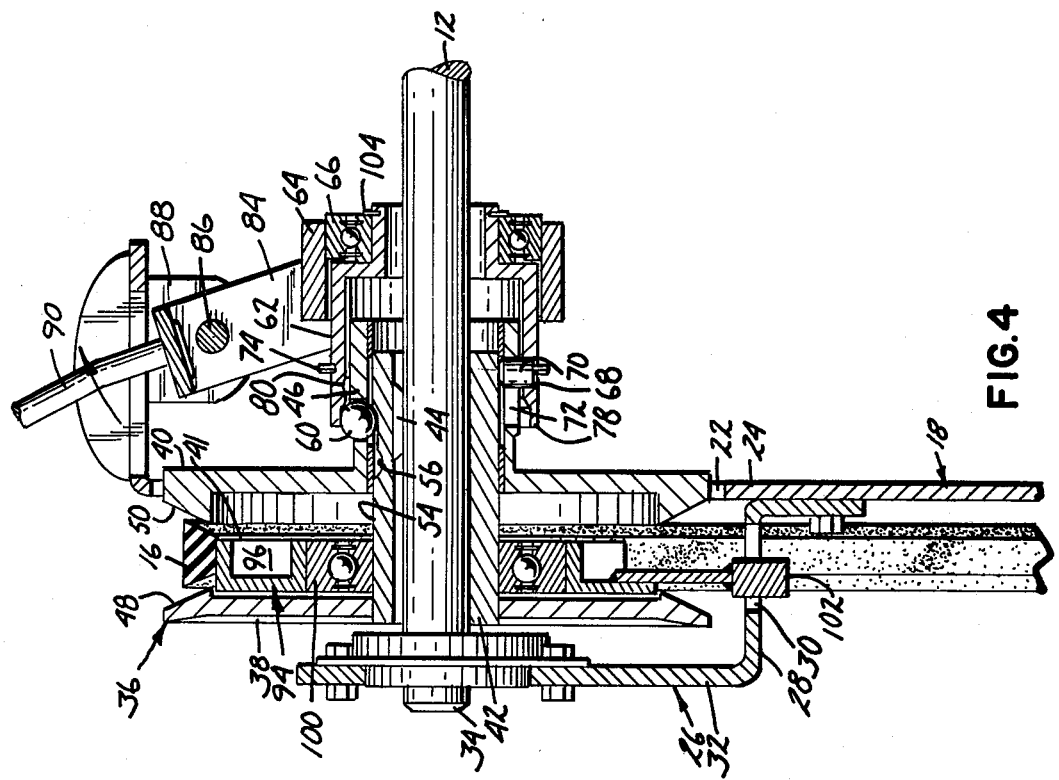

BRAKE CLUTCH

BACKGROUND OF THE INVENTION

The present invention relates broadly to an apparatus for selectively transmitting power between a rotating shaft and a belt drive. More specifically, the present invention relates to an improved clutch assembly and integral belt brake for selectively engaging and disengaging a rotating shaft from a drive or driven belt.

In the prior art, it is common to take power from or transmit power to a rotating shaft through a V-belt which engages a pulley affixed to the shaft. A typical prior art assembly may include a driving shaft connected to a power source and having a pulley mounted thereto. A driven shaft also has a pulley affixed thereto and the rotation of the drive shaft is imparted to the driven shaft by a belt wrapped about the pulleys. The prior art apparatus include clutch mechanisms to selectively engage and disengage the drive shaft from the power source. Independent brake mechanisms have been used to stop the rotation of the driven shaft upon disengagement from the power source. Typically, the brake mechanism may include an assembly designed to frictionally engage the V-belt to bring the belt and the driven shaft to a stop. In many instances, it is important that the driven shaft be stopped within a specified period of time after power disengagement. As an example, in rotary mowers the American National Standards Institute establishes minimum requirement stopping times for rotary cutting blades. The prior art apparatus, when used in the rotary mower environment, performs within the established ANSI standards.

The present invention, however, is an improvement over the prior art apparatus in that a more rapid stopping of the driven shaft or mechanism is achieved. The present invention is also an improved assembly with an integral brake member which eliminates separate and independent clutch and brake mechanisms. The elimination of separate and independent clutch and brake devices lead to manufacturing cost reductions and reduced operator maintenance operations. Additionally, the improved stopping characteristics of the integral brake member of the present invention far exceeds present standards.

SUMMARY OF THE INVENTION

The present invention is an apparatus for selectively transmitting power between a rotating shaft and a belt and includes a drive pulley mounted to the shaft for rotation therewith. The drive pulley has a belt engaging surface about its outer periphery. A brake member is mounted on the shaft and affixed against rotation with the shaft. The brake member has a frictional braking surface. Means are provided for selectively positioning the drive belt on the belt engagement surface or the frictional braking surface to engage or disengage, respectively, the drive belt from the rotating shaft.

In the preferred embodiment, the present invention includes a first member rigidly mounted to the drive shaft and having a belt engaging surface about its outer periphery. A second member is mounted to the drive shaft and is axially reciprocal along the shaft between a first engaged position and a second disengaged position. The second member also has a belt engaging surface about its outer periphery. The first and second members rotate with the shaft and in the first position the belt engaging surfaces thereof are in contact with the belt to transmit power between the rotating shaft and the belt. A brake member is also mounted to the shaft and affixed against rotation. The brake member is axially disposed on the shaft between the first and second members and in the second position of the second member the belt drops onto a frictional braking surface of the brake member. Means are provided for selectively locking the second member in the first and second positions.

The first member is an outer sheave half and the second member is an inner sheave half, the inner and outer sheave halves forming a pulley. The inner sheave half is mounted for axial reciprocation to and away from the outer sheave half. The brake member is essentially a disc having an annular outer end portion with a frictional braking surface thereon. The brake member is mounted about the shaft between the inner and outer sheave halves and means are provided for locking the brake member against rotation. In the preferred embodiment, a tab extends from the braking member and is received within a slot in a frame member to prevent rotation of the brake member.

The inner and outer sheave halves have belt engaging surfaces which are disposed radially at a greater distance from the axis of the shaft than the radial distance of the frictional braking surface from the axis of the shaft. When it is desired to disengage power transmission between the rotating shaft and the belt, the inner sheave half is moved axially to its second position wherein the belt is released from engagement with the inner and outer sheave halves and, since the belt is typically under tension, the belt drops onto the frictional braking surface of the brake member and is rapidly stopped. The oppositely disposed belt engaging surfaces of the inner and outer sheave halves cooperate to lift the belt from the frictional braking surface to engage the belt with the rotating shaft in the first position of the inner sheave half.

The present invention, therefore, provides an integral clutch and brake assembly requiring no adjustment between clutch and brake as in the prior art independent clutch and brake devices. Installation of the power transmission apparatus of the present invention is relatively simple and mechanical parts are eliminated. The present invention provides effective stopping of the belt in a short time following disengagement from the power source and additionally has been found to create minimal belt wear and tear. These and other advantages of the present invention will become apparent with reference to the accompanying drawings, detailed description of the preferred embodiment, and claims.

BRIEF DESCRIPTION OF THE DRAWINGS

FIG. 3 is an enlarged fragmentary sectional view taken generally along the line 3—3 of FIG. 1 illustrating the present invention in the belt engaged position;

FIG. 4 is an enlarged fragmentary sectional view similar to FIG. 3 showing the present invention in the belt disengaged position.

DETAILED DESCRIPTION OF THE PREFERRED EMBODIMENT

Figure 1:
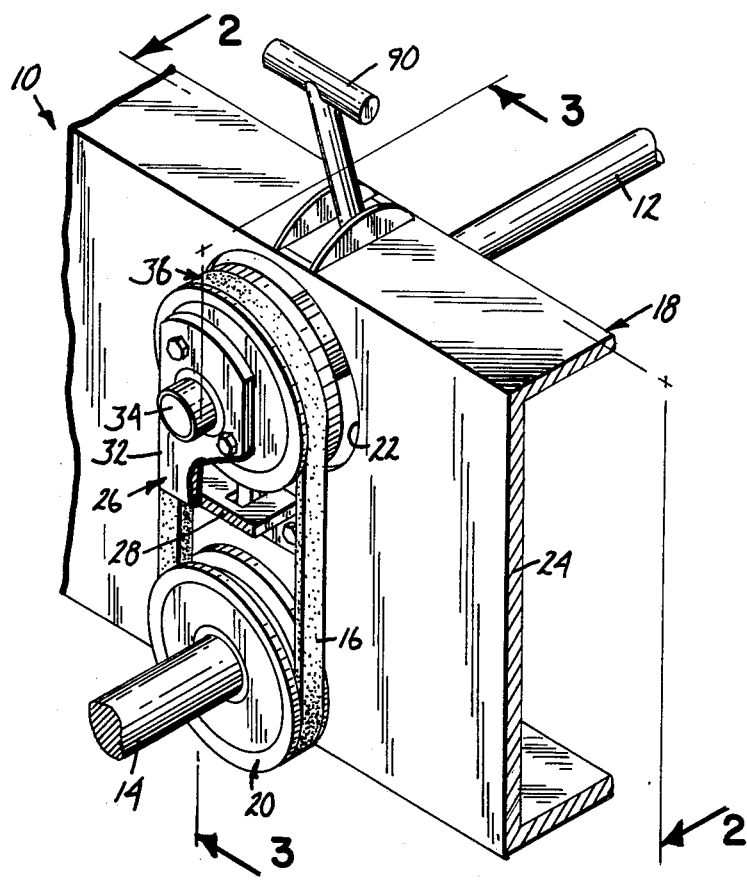
FIG. 1 is a view in perspective of the present invention with portions thereof cut away showing the present invention in a typical application thereof.
Figure 2:
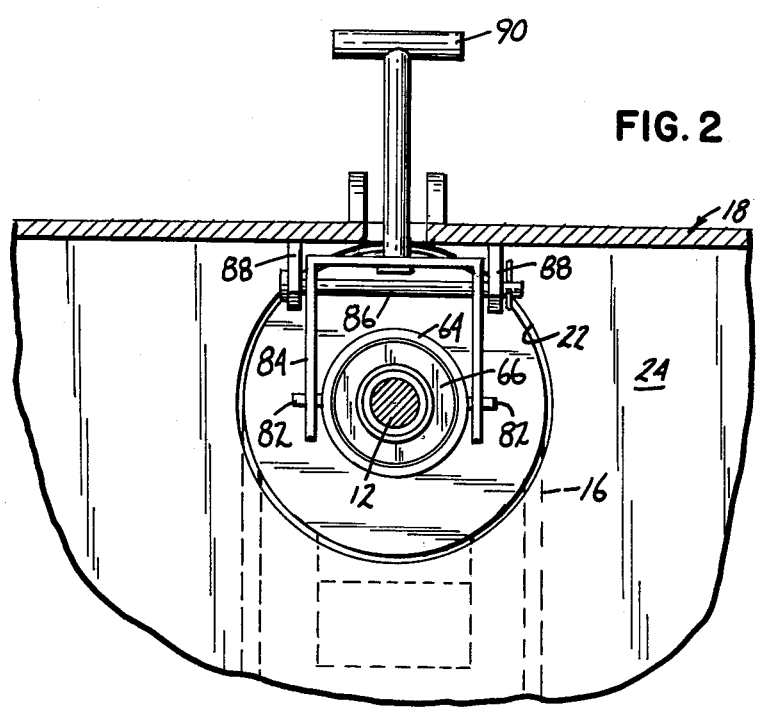
FIG. 2 is an enlarged fragmentary elevational view taken generally along the line 2—2 of FIG. 1.

Referring to the drawings, wherein like numerals represent like parts throughout the several views, FIG. 1 is a view in perspective illustrating a typical application of the present invention. The apparatus of the present invention is designated generally as 10. Apparatus 10 is in the typical application designed to selectively transmit power between a pair of rotating shafts 12 and 14 through a conventional V-belt 16. For the purpose of discussion hereafter, it will be assumed that shaft 12 is the drive shaft and is connected to a suitable power source (not shown) and that shaft 14 is the driven shaft. A portion of a frame member to which apparatus 10 and rotating shaft 12 is mounted is designated as 18. Shaft 14 has a pulley 20 rigidly mounted to one end thereof. Shaft 12 extends through an opening 22 in a wall 24 of frame member 18.

A bracket 26 is mounted to wall 24 and has a portion 28 extending outwardly from wall 24. Bracket portion 28 has a slot formed therein at 30, the purpose of which will be explained in more detail hereafter. Bracket 26 has a generally upright member 32 in which an end 34 of shaft 12 is rotatably mounted. A suitable prior art bearing means is provided to rotatably journal shaft 12 in upright member 32.

Apparatus 10 is shown in more detail in FIGS. 3 and 4 which illustrate engaged and disengaged positions of belt 16 with rotating shaft 12, respectively. Apparatus 10 is a clutch assembly that includes a pulley 36 with an outer sheave half 38 and an inner sheave half 40. Belt 16 is wrapped about pulleys 20 and 36 and is placed under tension. Conventional prior art means may be provided to maintain the desired tension on belt 16. Sheave half 38 is substantially a disk which is affixed to a tubular member 42. Tubular member 42 receives shaft 12 therein and is rigidly affixed to shaft 12 for rotation therewith by means of a key member 44 which is received within a keyway in shaft 12. It will be understood that alternative methods of rigidly affixing tubular member 42 to shaft 12 are also within the spirit and scope of the present invention. Tubular member 42 and therefore outer sheave half 38 are affixed to shaft 12 for rotation therewith.

Inner sheave half 40 is mounted about tubular member 42 for rotation therewith and rotation with shaft 12 as will be described subsequently in greater detail. Sheave half 40 also is a disk having an inner tubular member received about tubular member 42. When assembled, tubular members 42 and 46 have central axes that are aligned with each other and with the rotational axis of shaft 12. Sheave halves 38 and 40 are disposed in planes normal to the aligned central axes of tubular members 42 and 46. At its outer periphery, sheave half 38 has a V-belt engagement driving surface 48 which slopes or tapers radially inward in a direction generally toward shaft 12 and axially toward sheave half 40. Similarly, sheave half 40 has a V-belt driving and engagement surface 50 which also slopes radially inwardly toward shaft 12 and axially toward outer sheave half 38. Oppositely disposed driving and engagement surfaces 48 and 50 cooperate to hold belt 16 in driving engagement with pulley 36 in the engaged position as illustrated in FIG. 3. Inner sheave half 40 is mounted about tubular member 42 for axial reciprocation along the axis of shaft 12 in a direction to and away from outer sheave half 38.

Structure for mounting inner sheave half 40 for rotation with shaft 12 and axial reciprocation will now be described with particular reference to FIGS. 3 and 4. The specific structure disclosed herein is considered representative of a number of equivalent structures that would accomplish identical results. It is understood that such alternative equivalent structures are contemplated to be in the spirit and scope of the present invention. More specifically, in the preferred embodiment disclosed herein, tubular member 46 is provided with a plurality of circumferentially spaced apertures therein one of which is shown at 52. Tubular member 42 has an outer surface 54 in which is formed a plurality of channels 55, one of which is shown, that include a first channel portion 56 and a second channel portion 58. Stainless steel ball members 60 are captured within apertures 52 and channels 55 by an engagement and disengagement member 62. Member 62 is essentially tubular and is rotatably mounted in a collar 64 by suitable bearing means 66. Channel portions 56 and 58 are sized such that balls 60 can reciprocate axially therein but are retained against movement circumferentially about the rotational axis of shaft 12. First channel portion 56 is also deeper than second channel portion 58. Thus, the rotation of outer sheave half 38 with shaft 12 is transmitted to rotation of inner sheave half 40 through ball bearings 60. Driving and engagement member 62 is also provided with an aperture 68 in which is received a pin 70. Tubular member 46 has a slot 72 formed therein and in which pin 70 is slidably received. Pin 70 is retained by a snap ring 74. Driving and engagement member 62 has an inner surface which tapers outwardly at 76 to an annular end portion 78. Axially spaced from outward taper 76 is a slight detent or recess 80. Collar 64 has a pair of trunnions 82 extending outwardly therefrom and oppositely disposed thereon. Trunnions 82 are received in a U-shaped bracket 84 which is mounted to a shaft 86. Shaft 86 is pivotally and rotatably received within a pair of mounting brackets 88 affixed to frame member 18. A handle 90 is secured to bracket 84 and extends through an opening 92 in frame 18. Handle 90 is manually operable to shift inner sheave half 40 between the engaged and disengaged positions of FIGS. 3 and 4, respectively.

Mounted about shaft 12 and disposed axially between inner sheave half 40 and outer sheave half 38 is a brake member designated generally at 94. Brake member 94 is, in the preferred embodiment, a disc having an annular outer end portion 96 with a frictional braking surface 98 thereon. The radial distance of surface 98 from the axis of shaft 12 is less than the radial distance of surfaces 48 and 50 from the axis of shaft 12. Inner and outer sheave halves 38 and 40 define a chamber 41 in which member 94 is mounted. Brake member 94 is mounted by suitable bearing means 100 about tubular member 42. Tubular member 42 rotates with respect to brake member 94. Annular member 94 is held against rotation by means of a tab 102 which is affixed to brake member 94 and which extends radially outward with respect to the axis of shaft 12 and which is received in slot 30 formed in bracket portion 28. Tab 102, in the preferred embodiment, is somewhat loosely received within slot 30 but it is contemplated that within the spirit and scope of the present invention tab 102 could be rigidly affixed within slot 30. At any rate, tab 102 within slot 30 prevents rotation of brake member 94.

The operation of the present invention will now be described with particular reference to FIGS. 3 and 4. In the engaged position illustrated in FIG. 3, driving and engagement surfaces 48 and 50 of outer and inner sheave halves 38 and 40, respectively, frictionally engage and grip V-belt 16 therebetween. Power is thereby transmitted to belt 16 from drive shaft 12. Belt 16 is also in frictional engagement with pulley 20. Shaft 14 is driven by the transmission of power from shaft 12 through apparatus 10 and belt 16. As previously described, outer sheave half 38 is rigidly mounted to shaft 12 and therefore rotates therewith. Inner sheave half 40 also rotates with shaft 12 through the connection between tubular member 42 and tubular member 46 provided by ball bearings 60 received within apertures 52. In the engaged position, bearings 60 are captured between first channel portion 56 and recess 80 locking inner sheave half 40 in the engaged position. As previously mentioned, engagement and disengagement member 62 also rotates with shaft 12 through the connection made by pin 70 within slot 72 of tubular member 46.

As shown in the drawings, when it is desired to terminate power transmission to driven shaft 14, handle 90 is pushed forward or counterclockwise. Collar 64 is moved axially away from pulley 36. Since collar 36 is rigidly connected to driving and engagement member 62, in part through a split ring 102, driving and engagement member 62 also begins to move axially away from pulley 36. Member 62 rides over bearings 60 until bearings 60 are captured between channel portion 56 and annular end portion 78. Pin 70 then engages an end 107 of slot 72 and further movement of member 62 causes axial movement of member 46 and therefore sheave half 40. Since ball bearing members 60 are received within apertures 52 in tubular member 46 of inner sheave half 40, as inner sheave half 40 is moved axially away from outer sheave half 38 ball bearings 60 are lifted from channel portion 56 into channel portion 58. As inner sheave half 40 moves axially away from outer sheave half 38, belt 16 is released from its frictionally driving contact with surfaces 48 and 50. In typical application, belt 16 is wrapped about pulley 36 and pulley 20 and placed under tension such that when belt 16 is released from frictional contact with surfaces 48 and 50, it drops into contact with frictional braking surface 98 of brake member 94 as shown in more detail in FIG. 4. As previously described, brake member 94 is held against rotation by tab 102 received within slot 30. The frictional engagement of belt 16 with surface 98 of brake member 94 will bring belt 16 to a rapid stop thereby also stopping rotation of shaft 14. In an embodiment wherein tab 102 is somewhat loosely received within slot 30 it is understood that brake member 94 may initially rock in one direction or the other when belt 16 drops unto surface 98. However, the motion of brake member 94 is minor and belt 16 is still brought to a rapid stop.

In the disengaged position illustrated in FIG. 4 ball bearings 60 are captured between the outward tapering surface at 76 and annular end portion 78. Engagement and disengagement member 62, and inner and outer sheave halves 38 and 40 continue to rotate with drive shaft 12.

To re-engage apparatus 10, handle 90 is rotated in a clockwise direction as shown in FIG. 4. Bracket 84 pivots about its shaft 86 causing collar 64 to move axially toward end 34 of shaft 12. Ball bearings 60 engaged by outward taper 76 begin to move axially toward end 34 with collar 64 and tubular member 46 whereby inner sheave half 40 continues axial movement toward outer sheave half 38. Surfaces 48 and 50 engage belt 16 lifting belt 16 from surface 98 of brake member 94. Ball bearings 60 are rolled into first channel portion 56. Further axial movement of member 62 with respect to inner sheave half 40 results in the inner surface member 62 riding over ball bearings 60 until bearings 60 are captured between recess 80 and first channel portion 56. Inner sheave half 40 is thereby locked in the engaged position illustrated in FIG. 3.

It will be understood that sliding surface structures that are the equivalent of the structure disclosed herein that includes tubular member 42, ball bearings 60, tubular member 46, engagement and disengagement member 62, and collar 64 are contemplated within the spirit and scope of the present invention. It is contemplated that equivalent sliding surface structures that comprise a means for locking the inner sheave half in the engaged and disengaged positions would be equally effective as the preferred embodiment disclosed herein.

The present invention has proven to be more effective in bringing a driven belt to a rapid stop after power has been removed therefrom. For example, in a typical application wherein the apparatus of the present invention is used to transmit power through a drive belt to a plurality of rotary cutting blades on a mower deck, it was found that the cutting blade drive belt and therefore the cutting blades themselves were stopped within 3 to 5 seconds after the belt was disengaged from the drive pulley. Such stopping times were well within the standards set by American National Standards Institute with regard to rotary mower apparatus.

From the above, it can be understood that the present invention is an improved clutch assembly for selectively transmitting power from a rotating shaft to a belt and includes a belt pulley with an integral automatic brake. The improved clutch assembly of the invention has applicability in any environment where power is transferred between a driving and a driven member through a belt and wherein it is desirable to bring the belt and driven member to a rapid stop after disengagement with the power drive.

What is claimed is:

1. Apparatus for selectively transmitting power between a rotating shaft and a drive belt, comprising:
    (a) a drive pulley mounted to the shaft for rotation therewith, said drive pulley having a belt engaging surface about the outer periphery thereof;
    (b) a brake member mounted about the shaft and affixed against rotation therewith, said brake member having a frictional braking surface thereon; and
    (c) means for selectively positioning the drive belt on said belt drive surface or said frictional braking surface to engage or disengage, respectively, the drive belt from the rotating shaft.

2. Apparatus in accordance with claim 1 wherein said drive pulley comprises:
    (a) a first sheave half rigidly affixed to the shaft for rotation therewith and having a belt engaging surface about the outer periphery thereof; and
    (b) a second sheave half affixed to the shaft for rotation therewith and mounted for axial reciprocation along the shaft between first and second positions, said second sheave half having a belt engagement surface about the outer periphery thereof;
    (c) said belt engagement surfaces on said first and second sheave halves cooperating to frictionally engage the belt in said first position; the belt disengaged from said sheave halves in said second position and engaged with said frictional braking surface of said brake member.

3. Apparatus in accordance with claim 2 wherein said brake member is disposed axially on the shaft between said first and second sheave halves whereby the belt drops onto said frictional braking surface with said second sheave half in said second position.

4. Apparatus in accordance with claim 3 wherein said means for selectively positioning the drive belt on said belt engagement surfaces or said frictional braking surface further comprises means for axially reciprocating said second sheave half between said first and said second positions.

5. An integral clutch and brake assembly for selectively transmitting power between a rotating shaft mounted in a frame and a belt under tension, comprising:
  (a) a first member rigidly mounted to a shaft for rotation therewith and having a belt engaging surface about its outer periphery;
  (b) a second member mounted about the shaft for rotation therewith and reciprocation along the axis of the shaft between first and second positions, said second member having a second belt engaging surface about its outer periphery, said first and second belt engaging surfaces cooperating to frictionally engage the belt in said first position to transmit power between the shaft and the belt; the belt disengaged from said first and second engagement surfaces in said second position;
  (c) a brake member mounted about shaft and axially disposed on the shaft generally between said first and second members, said brake member having a frictional braking surface on its outer periphery, whereby in said second position of said second member the belt contacts said frictional braking surface;
  (d) means for axially reciprocating said second member between said first and second positions; and
  (e) means for affixing said brake member against rotation with the shaft.

6. An integral clutch and brake assembly in accordance with claim 5 wherein said first and second members comprise first and second disks mounted about the shaft and having a first radial dimension measured from the axis of the shaft to the outer periphery of said disks, and wherein said first and second belt engaging surfaces are oppositely disposed surfaces that taper radially inward from the outer periphery of said disks and axially toward each other; and wherein said brake member comprises a third disk with a second radial dimension measured from the axis of the shaft to its outer periphery; said second radial dimension smaller than said first radial dimension, said frictional braking surface disposed radially inward with respect to said first and second belt engaging surfaces on said first and second disks.

7. An integral clutch and brake assembly in accordance with claim 6 wherein said first disk has a first tubular portion through which the shaft extends and which it is rigidly affixed to the shaft; and wherein said second disk has a second tubular portion slidably mounted about said first tubular portion for axial reciprocation with respect to said first tubular portion.

8. An integral clutch and brake assembly in accordance with claim 7 comprising means for connecting said first and second tubular portions whereby said first and second disks rotate with the shaft.

9. An integral clutch and brake assembly in accordance with claim 8 wherein said first tubular member is provided with at least one channel in the outer surface thereof and wherein said second tubular member has at least one aperture therein, and wherein said connecting means comprises:
  (a) at least one ball bearing disposed within said channel and captured within said aperture; and
  (b) means for retaining said at least one ball bearing within said channel and said aperture.

10. An integral clutch and brake assembly in accordance with claim 9 wherein said means for axially reciprocating said second disk comprises:
  (a) an engagement and disengagement member comprising a third tubular member mounted about said second tubular member and having an inner surface in contact with said ball bearing to retain said ball bearing within said aperture in said second tubular member; and a pin mounted in an aperture in said third tubular member said second tubular member having a slot formed therein in which is slidably received said pin;
  (b) a collar in which said engagement and disengagement member is rotatably mounted; and
  (c) means for axially reciprocating said collar.

11. An integral clutch and brake assembly in accordance with claim 5 wherein said means for affixing said brake member against rotation with the shaft comprises a tab affixed to said brake member and extending radially outward therefrom with respect to the axis of the shaft and mounted to the frame.

* * * * *